(12) United States Patent
Custance

(10) Patent No.: US 10,165,109 B1
(45) Date of Patent: Dec. 25, 2018

(54) TELEPHONY SOFTWARE CONTROL VIA WEB APPLICATION

(71) Applicant: PloyTech IPCO Pty Ltd., Victoria (AU)

(72) Inventor: Grant Custance, Toorak (AU)

(73) Assignee: PLOYTECH IPCO PTY LTD., Melbourne, Victoria (AU)

(*) Notice: Subject to any disclaimer, the term of this patent is extended or adjusted under 35 U.S.C. 154(b) by 0 days.

(21) Appl. No.: 15/924,097

(22) Filed: Mar. 16, 2018

Related U.S. Application Data

(60) Provisional application No. 62/632,779, filed on Feb. 20, 2018.

(51) Int. Cl.
| | |
|---|---|
| *H04M 1/667* | (2006.01) |
| *H04M 1/67* | (2006.01) |
| *H04M 1/673* | (2006.01) |
| *H04M 3/38* | (2006.01) |
| *H04L 29/06* | (2006.01) |
| *G06F 9/54* | (2006.01) |

(52) U.S. Cl.
CPC .............. *H04M 3/38* (2013.01); *G06F 9/547* (2013.01); *H04L 63/102* (2013.01); *H04L 63/108* (2013.01); *G06F 2209/549* (2013.01)

(58) Field of Classification Search
USPC ........................................................ 379/188
See application file for complete search history.

(56) References Cited

U.S. PATENT DOCUMENTS

| | | | |
|---|---|---|---|
| 2008/0082594 A1* | 4/2008 | Soltes ............... | G06F 17/30067 |
| 2012/0240176 A1* | 9/2012 | Ma .................... | H04N 21/23439 725/114 |
| 2015/0271343 A1* | 9/2015 | Mkr ........................ | H04M 7/15 379/114.03 |
| 2015/0281451 A1* | 10/2015 | Gajjar ................. | H04M 3/5191 379/265.09 |
| 2016/0323270 A1* | 11/2016 | Anand ................ | H04L 63/0807 |

* cited by examiner

*Primary Examiner* — Harry S Hong
(74) *Attorney, Agent, or Firm* — Beyer Law Group LLP

(57) ABSTRACT

A Web application (such as a workforce management application) on a cloud computing platform controls telephony software used by an agent who operates a remote agent computer. The telephony software may reside on the agent computer, may reside in the cloud and be used by the agent using a browser, or may reside in the cloud and include a client on the agent computer. The agent does not have access to login credentials of the telephony software and cannot log in. The Web application remotely controls the telephony software using an API and makes decisions based upon the scheduled shift activities of the agent or demand for tasks within the enterprise or call center. The Web application is able to log the agent in to or off of the telephony software or to change the status of the agent within the telephony software.

21 Claims, 13 Drawing Sheets

Agent Denied Access

WFM Dashboard Screen

Self-Service Tasks

Agent Denied Access to Softphone

Softphone Blocked

Softphone Shift Over

Agent Logged off of Softphone

FIG. 14 Agent Schedule View

TELEPHONY SOFTWARE CONTROL VIA WEB APPLICATION

This application claims priority of U.S. provisional patent application No. 62/632,779, filed Feb. 20, 2018, entitled "Softphone Control via A Workforce Management (WFM) Solution," which is hereby incorporated by reference.

FIELD OF THE INVENTION

The present invention relates generally to telephony software. More specifically, the present invention relates to controlling access to telephony software using a workforce management application (for example), for employees making or receiving telephone calls.

BACKGROUND OF THE INVENTION

With the recent introduction of cloud-based technology, more reliable fast Internet connections, and advanced security protocols, there is now greater acceptance of home-based contact center agents who operate remotely from a standard office environment. In other words, rather than a contact center (or call center) housing dozens or even hundreds of agents who all make and receive telephone calls from that location, and agent is now able to work from home (or from another location outside of the supervision in a contact center) using his or her own (or company supplied) computer.

While operating out of a home (or other location) outside of the supervision found in a contact center, an agent is able to make and receive telephone calls using telephony software that may not be within the scope of their employment, i.e., personal telephone calls. Understandably, control of these telephony costs and agent productivity can be problematic for a company; vigilance of agents and after-the-event analysis is common practice and sometimes required.

Currently, an agent logs into the telephony software himself or herself using any computing device connected to the Internet and is then able to take or make any telephone calls, or perform other defined activity. Because the agent is not in a contact center and is unsupervised, there is no way to restrict the agent's access to the telephony software in order to manage his or her scheduled activity or to manage telephony costs. Supervision of this agent activity and controlling access to the telephony software can be problematic. Accordingly, new techniques and systems are desired to address these problems.

SUMMARY OF THE INVENTION

To achieve the foregoing, and in accordance with the purpose of the present invention, a technique is disclosed that controls telephony software from a Web application, such as a Workforce Management application. This technique seamlessly logs on to the telephony software by first having the agent log in to a Web application in order to indicate that they are ready to commence a work activity. If the agent is not recognized, access to the telephony software is denied. If the agent is not scheduled to use the telephony software then access to the telephony software is also denied. If the agent is scheduled to use the telephony software, then access to the telephony software is allowed during the scheduled time. Because the agent cannot clock on to an activity that is not scheduled, the softphone cannot be activated and thus the Web application is able to block unauthorized use of the softphone by the agent (and corresponding claims from the agent for payment of services).

This technique makes use of some of the core functions of a WFM application. A workforce management (WFM) application is a computer program that automates employee schedules for the organization using, for example, defined business rules, enterprise bargaining agreements, industry awards, etc., and typically provides employees: access to work-related information; access to their schedule on a daily, weekly or monthly view; and a self-service portal to submit leave requests, to shift swaps, etc. A WFM application can also take historical workload statistics to predict future workload requirements and build employee shifts and rosters that meet the requirements of business rules, employee availability and many other requirements. Although the invention works well with any suitable WFM application, use of the invention with a WFM application is not required.

The present invention controls access to the telephony software, saves on operating costs, improves customer service and organizational productivity, and at the same time provides agent empowerment of their home working environment.

BRIEF DESCRIPTION OF THE DRAWINGS

The invention, together with further advantages thereof, may best be understood by reference to the following description taken in conjunction with the accompanying drawings in which:

FIG. 14 shows an embodiment in which multiple agents are each using telephony software from different agent computers.

DETAILED DESCRIPTION OF THE INVENTION

Figure 1:
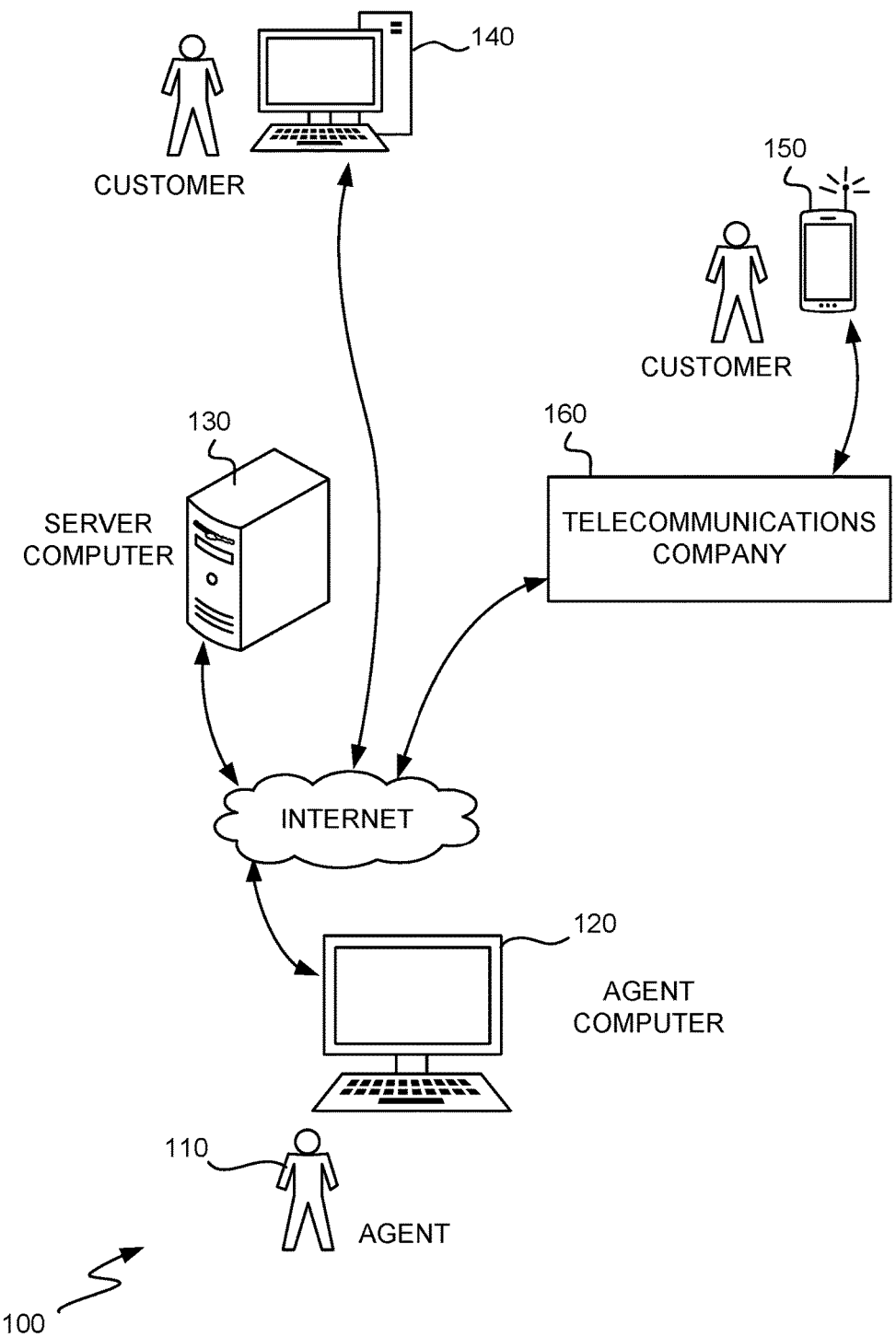
FIG. 1 is one embodiment of a system used to implement the present invention.

FIG. 1 is one embodiment of a system 100 used to implement the present invention. Shown is an agent 110 using an agent computer 120 in order to make telephone calls over the Internet to customers of a particular organization. The organization may be any business that employs agents to interact with its customers, via telephone, in order to provide customer service, including: general customer account service inquiries, debt collection, dispute resolution, accepting and completing sales transactions, marketing promotions, etc. Agents 110 may be any users who are employees, contractors or other of the organization who undertake to perform these activities on behalf of the organization. Typically, these agents may use any computing device 120 such as a desktop computer, laptop computer, tablet computer or mobile telephone in order to perform these activities. And, while the invention is especially useful for those agents working at home (or outside of the supervision of a contact center of the organization), the invention may also be used for those agents and their computers working within a contact center.

As shown in FIG. 1, an agent 110 uses telephony software on computer 120 in order to speak with a customer using a telephone 150. The telephone 150 may be any suitable telephone such as a traditional wired landline or even a mobile telephone. In this situation, communications would pass through the infrastructure of a telecommunications company 160 before passing through the Internet in order to be routed to the agent computer. It is also possible that a customer may be using a computing device 140 (such as a computer or mobile telephone) in order to speak with agent 110, in which case that customer may be using software such as Skype, WhatsApp, Viber, etc., in order to speak with the agent over the Internet, thus bypassing a traditional telecommunications company. Server computer 130 is a computer located within a cloud computing platform controlled by the organization that is able to remotely control the telephony software used by the agent as will be described in greater detail below.

Various Embodiments of the Invention

Figure 2:
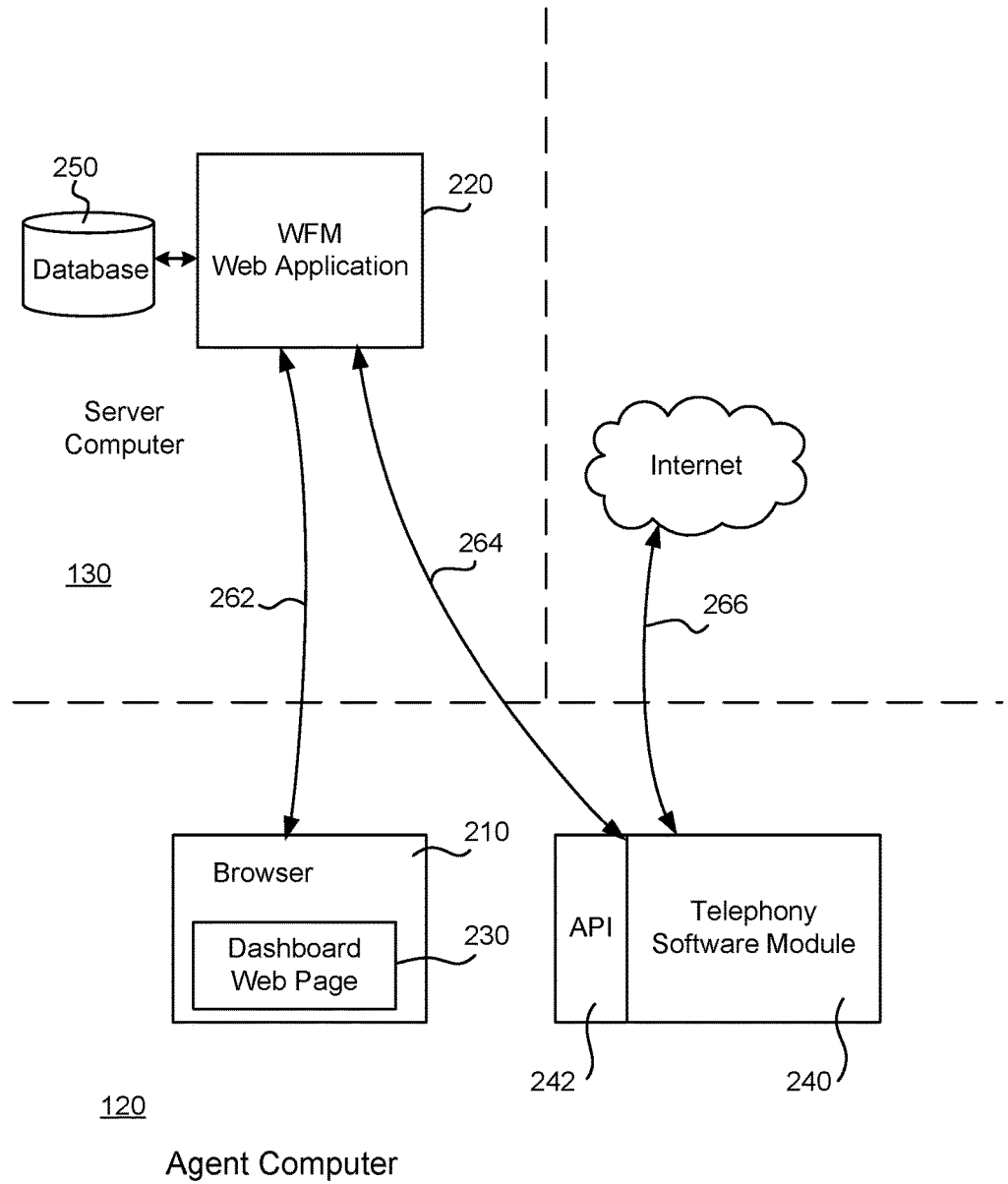
FIG. 2 illustrates in greater detail one embodiment of a system in which the telephony software module is resident on the agent computer.

FIG. 2 illustrates in greater detail one embodiment 200 of system 100 in which telephony software module 240 is resident on the agent computer 120. As known in the art, telephony software (often referred to as a "softphone") is a software program for making and taking telephone calls and for performing other defined activities over the Internet using a general purpose computer (for example), rather than using dedicated hardware such as a traditional wired telephone used at home or in business that uses the traditional telecommunications network. The invention is suitable for use with a wide variety of telephony software such as Mitel, SAP Contact Centre, Hosted Collaboration Solution, AT&T UC Voice, Skype for Business, Sametime, Vocalcom, ShoreTel, etc. Although the telephony software may be any suitable softphone, in one specific embodiment, the softphone is an Amazon Connect softphone and application 220 is able to control the softphone using "Connect.JS" (a JavaScript package) as will be described in more detail below.

As shown, server computer 130 executes a Web application such as a workforce management application 220. A workforce management (WFM) application is a computer program that automates employee schedules for the organization using, for example, defined business rules, enterprise bargaining agreements, industry awards, etc., and provides employees: access to work-related information; access to their schedule on a daily, weekly or monthly view; and a self-service portal to submit leave requests and to shift swaps. A WFM application can take any historical workload statistics to predict future workload requirements and build employee shifts and rosters that meet the requirements of business rules, employee availability and many other requirements. Any suitable WFM application may be used with the present invention; in one specific embodiment, the WFM application is "Time2Work" available from PloyTech IPCO Pty Ltd., an Australian incorporated company. Other suitable WFM applications include Verint, CXone, Genesys, Calabrio One, Aspect, Teleopti, Noble Enterprise, Injixo, U-WFM, Monet Software and Workforce Software This invention is preferably used with a WFM application in order to enable the use of the softphone to be managed by the WFM application in conjunction with the agent's scheduled activity. In fact, Web application 220 need not be a WFM application; it may be any other suitable software application adapted as described below.

Application 220 will typically have an associated database 250 into which it logs information. In the course of the flow diagram described below, each status change of the agent (in the WFM application or in the softphone) is logged into this database as well as information such as calls answered and calls made.

As shown, an agent uses his or her computer having a browser 210 in order to access (over the Internet, via link 262) the remote server computer 130 which is executing the Web application 220. Once logged in to the workforce management application, the agent is presented with an "employee dashboard" 230 which is a Web page of the workforce management application that allows agents to view information relevant to their employment and schedule. The employee dashboard allows agents to view scheduled shifts, multiple activities of that shift, clock-on time, an off-duty break, lunch-time break, clock-off time, and an availability option to swap shifts and apply for leave. During a shift, an agent may have a variety of activities to perform, known as shift activities. Each shift activity is a defined service provided to the agent and assigned by the workforce management application. The service is defined by the custom business requirements, business rules, the agent skills, competencies and availability on a scheduled basis. As will be explained in greater detail below, the workforce management application 220 communicates with, and controls, telephony software 240 over link 264 using API 242 of that telephony software. In addition to calling API functions in order to control the softphone, WFM application 220 may also monitor agent state change events occurring on the softphone using API functions of the softphone; the application may poll for an event or may wait for notification of events.

Although FIG. 2 shows telephony software module 240 executing upon the agent computer, in other embodiments the telephony software may be hosted upon and execute upon a different computer or computers. For instance, the telephony software may be a cloud-based service (executing exclusively upon a server computer in a cloud computing platform) that the agent accesses and uses using his or her browser 210. Or, the telephony software may be primarily cloud-based, but also include a software client on the user computer.

Figure 3:
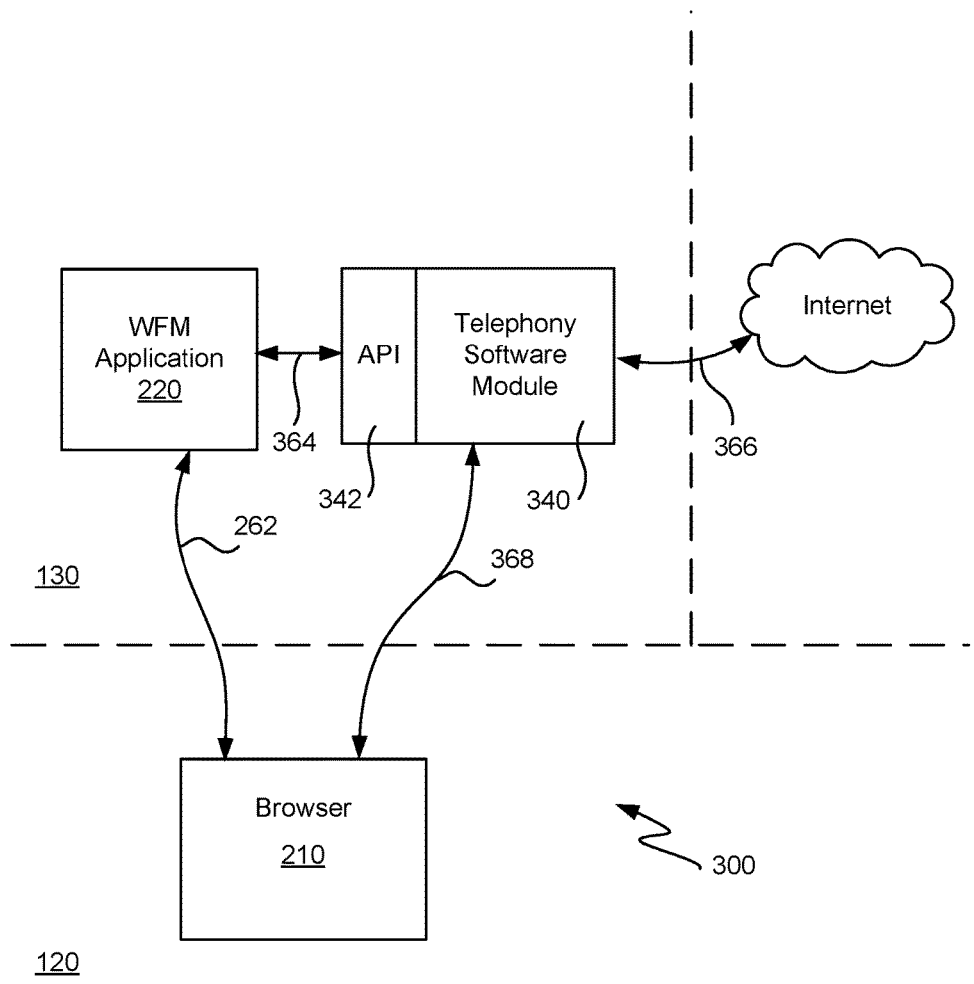
FIG. 3 illustrates in greater detail one embodiment of a system in which the telephony software module is resident on the server computer.

FIG. 3 illustrates in greater detail one embodiment 300 of system 100 in which telephony software module 340 is resident on the server computer 130. Module 340 also includes an API 342 with which communication and control is possible with workforce management application 220. In this embodiment, WFM 220 may interact with the telephony software as described above over link 364 using API 342 (or other similar interface) of the telephony software. Although application 220 and softphone 340 are shown as both being resident on server computer 130, it is also possible for softphone 340 (along with its API 342) to be executing on a different server computer also on a cloud computing platform. In this embodiment, the agent's browser 210 also communicates directly with softphone 340 over link 368 in order to permit the agent to make and receive telephone calls over the Internet. In this embodiment, softphone 340 may be any of a variety of softphone products such as those listed above or others. In this embodiment, the communication between the WFM and API 342 is the same or similar as in FIG. 2. For example, the communication may be established using SAML 2.0 in order to achieve Single Sign On (SSO), and subsequent communications are achieved using a softphone vendor's CTI Link, such as stream-connect.js, on Amazon Connect.

Once the WFM logs the agent on to the softphone, control handed over to the agent's computer and the agent will be able to use the softphone as normal with all softphone status changes being reported back to the WFM application for adherence reporting. The agent will be able to log off of the softphone but will not be able to log back in as they will not have the softphone login credentials. The agent will need to return to their WFM dashboard in order to log in again if the agent desires to use the softphone. The agent's browser will be directly communicating with the softphone as shown, once logged in to the softphone, i.e., the agent will be controlling the softphone after the WFM has logged on the agent in to the softphone.

Figure 4:
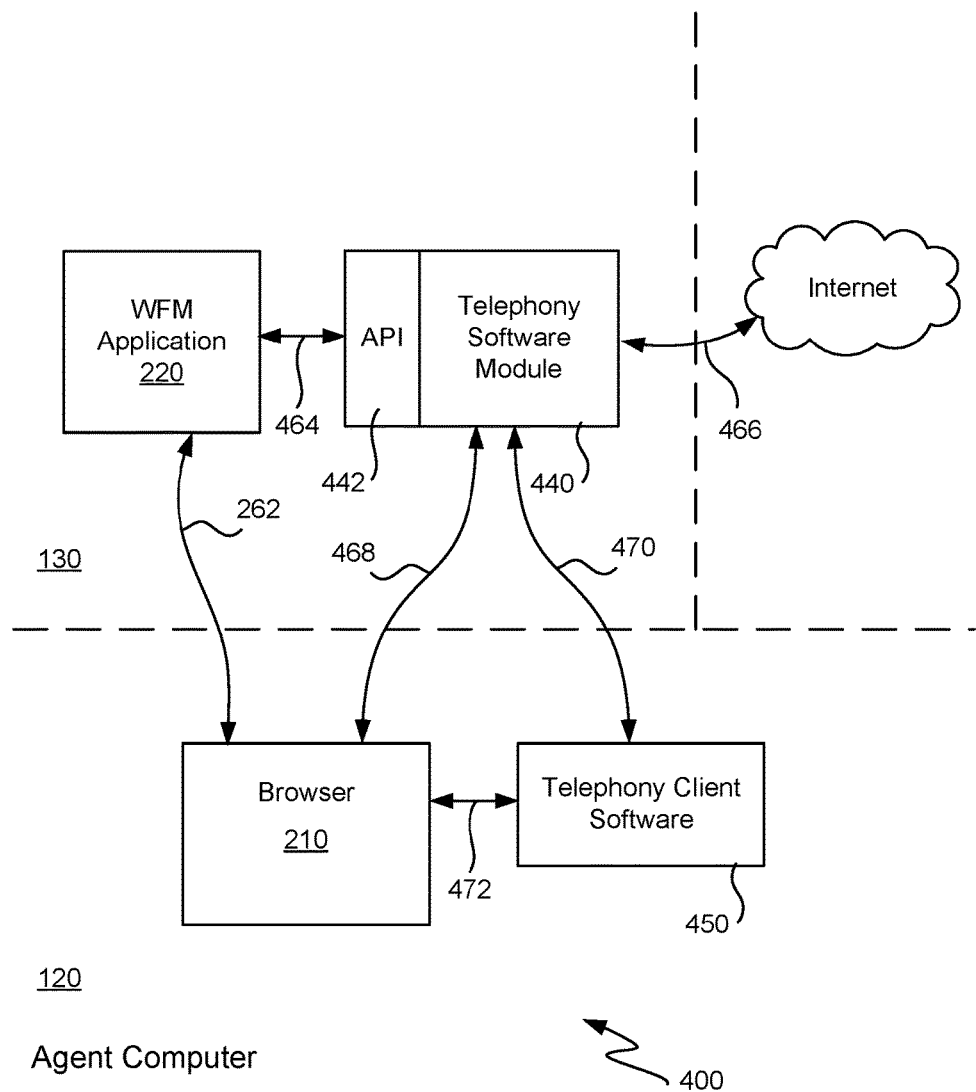
FIG. 4 illustrates in greater detail one embodiment of a system in which the telephony software includes a software application executing upon a server computer, as well as telephony client software executing upon the agent computer.

FIG. 4 illustrates in greater detail one embodiment 400 of system 100 in which the telephony software includes a software application 440 executing upon server computer 130, as well as telephony client software 450 executing upon the agent computer 120. Module 440 includes an API 442 with which communication and control is possible with workforce management application 220 over link 464. In this embodiment, WFM 220 may interact with the telephony software as described above using API 442 (or other similar interface) of the telephony software. Although application 220 and softphone 440 are shown as both being resident on server computer 130, it is also possible for softphone 440 (along with its API 442) to be executing on a different server computer also on a cloud computing platform. In this embodiment, telephony client software 450 executes directly on the agent's computer in order to permit the agent to make and receive telephone calls over the Internet, under control of the workforce management application 220, as will be described in greater detail below. In this embodiment, softphone 440 may be any of a variety of softphone products such as those listed above or others.

Flow Diagram—Agent Login

Figure 5A:
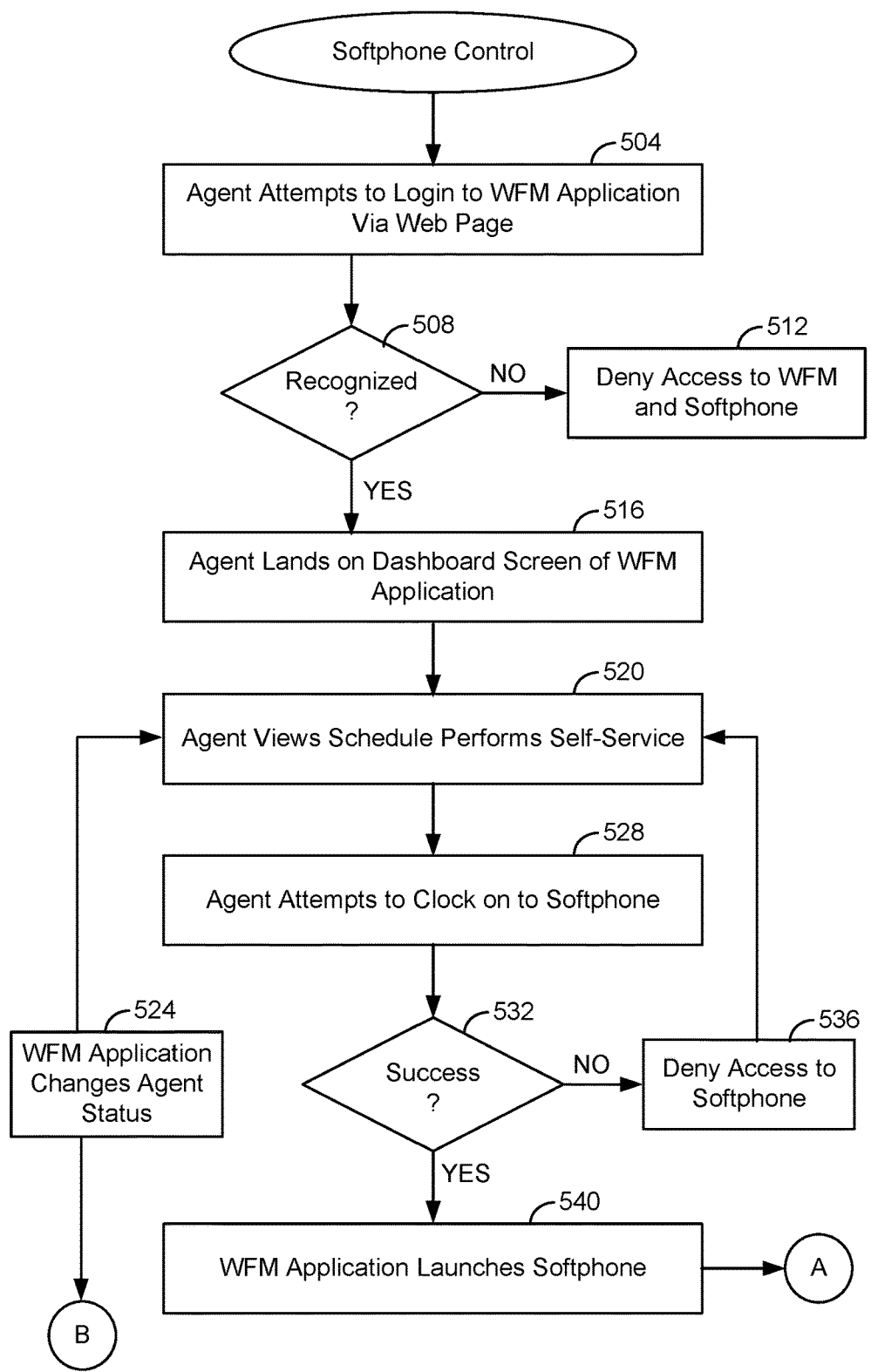
FIGS. 5A and 5B are a flow diagram describing one embodiment by which the agent's softphone is controlled by the workforce management application.
Figure 5B:
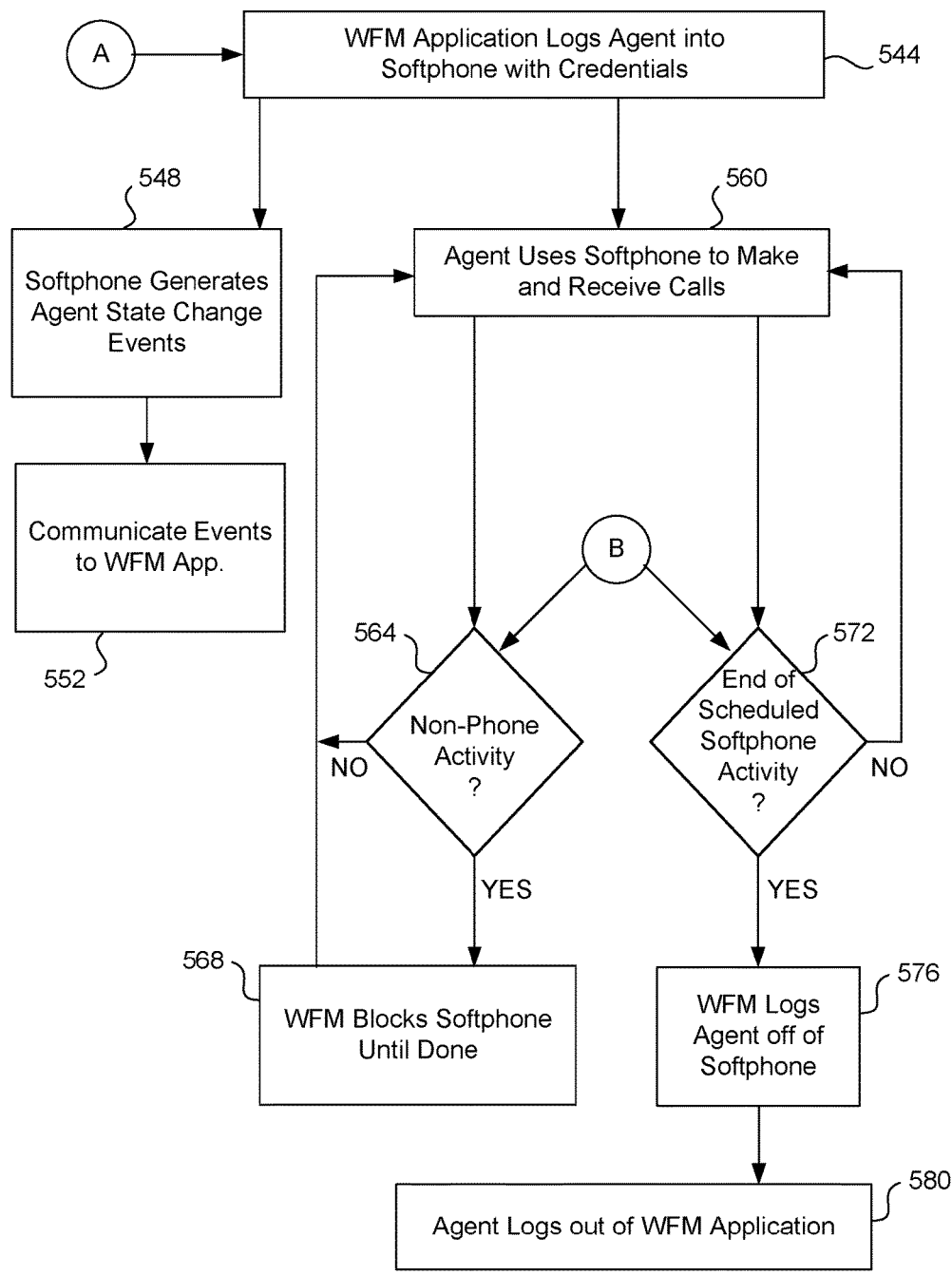

FIGS. 5A and 5B are a flow diagram describing one embodiment by which the agent's softphone is controlled by the workforce management application. This flow diagram references embodiment 200 of FIG. 2 in which softphone 240 executes on the agent computer; one of skill in the art will understand how to implement the invention using the embodiments of FIGS. 3 and 4 by reference to the below description.

In a first step 504, agent 110 attempts to log into the WFM application 220 by using an Internet browser of their agent computer 120. Typically, the agent will access the WFM application via a Web page showing a login screen. The agent may be prompted to log in to their WFM application by receiving a notification (such as a push notification) on any computing device that their shift is about to start, may be prompted by simply reading their written schedule, or may be prompted by other means. The agent logs in by entering their WFM user identifier and password. Step 508 determines whether the agent is recognized or not.

Figure 6:
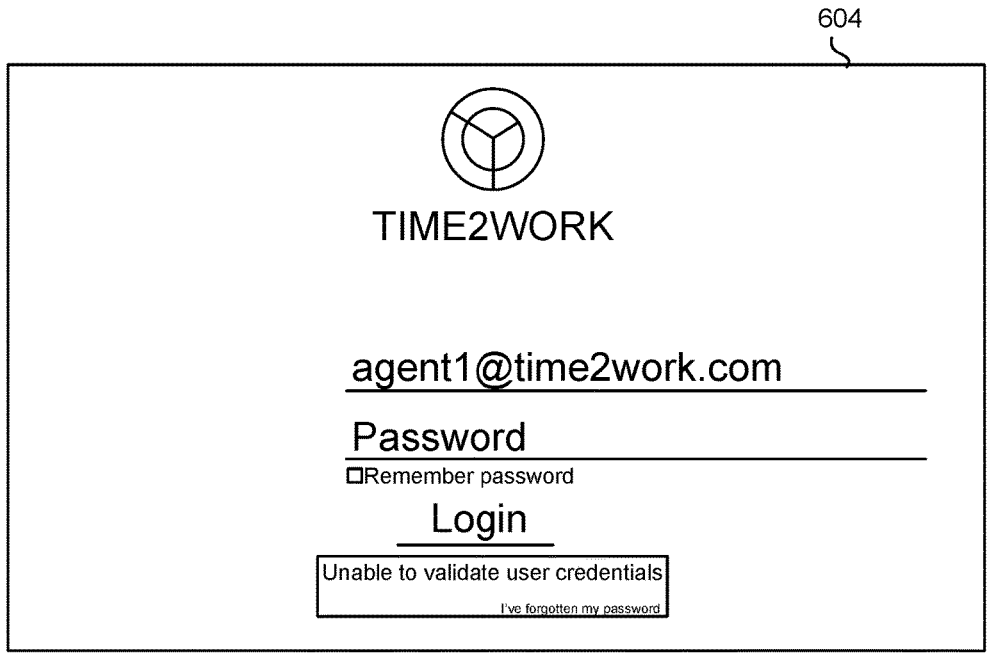
FIG. 6 is a Web page presented on the browser of the agent computer indicating that the WFM application is unable to validate the agent WFM credentials.

FIG. 6 shows a Web page 604 presented on the browser of the agent computer indicating that the WFM application is unable 608 to validate the agent WFM credentials because the agent's identifier and password are not recognized as belonging to a valid agent by the WFM application. Accordingly, in step 512 the agent is denied access to the WFM application. In addition, the agent is also denied access to softphone 240 on their computer because the login credentials for softphone 240 are stored in a database by the WFM application, and because the WFM application in this instance will not take steps to log the agent into softphone 240. Further, the agent is unaware of these login credentials because they are not provided to the agent by their employer, by the WFM application or by another entity and therefore cannot log in to the softphone directly.

If the agent were to attempt to execute the softphone on his or her computer, he or she would not have the credentials to log in so will be denied access to the softphone. The agent would see a softphone login screen but would be unable to log in simply because they do not know the user identifier and password.

Flow Diagram—View Schedule and Agent WFM Status

Figure 7:
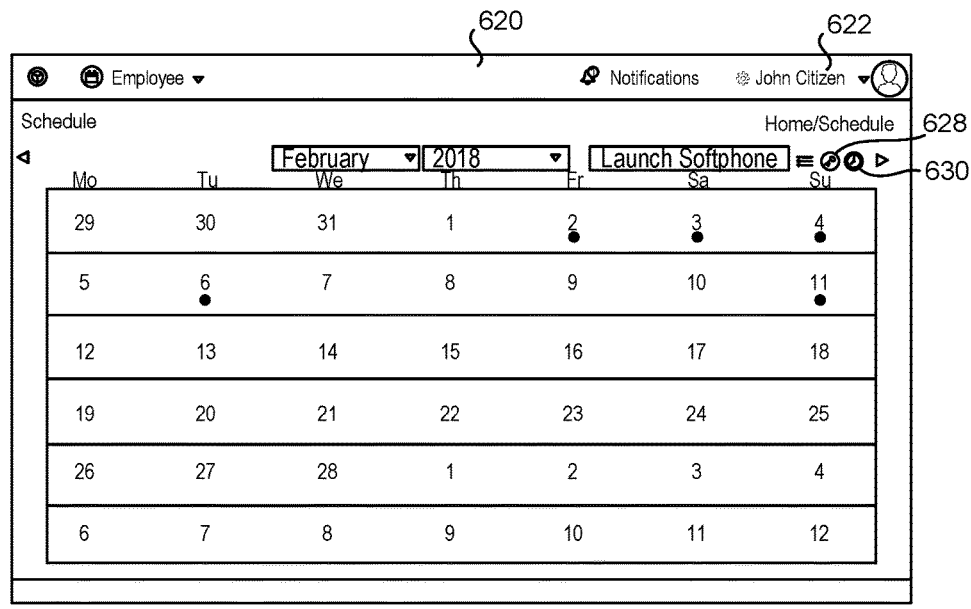
FIG. 7 is a dashboard screen presented as a Web page on the browser of the agent computer when the WFM application does validate the agent's credentials.

If the agent is recognized by the WFM application, then in step 516 the agent lands on a dashboard screen of the WFM application. FIG. 7 shows a dashboard screen 620 presented as a Web page on the browser of the agent computer when the WFM application does validate the agent's credentials. Typically, this dashboard screen shows the agent's schedule in a calendar view including the name of the agent and other options 622, the current day 624, a highlighted day 626 indicating that a shift has been offered, a key icon 628 providing the ability to view an explanation of the different statuses that shifts can have, a clock icon 630 providing the ability to clock in to the shift and register that they have commenced work, and a button 632 allowing the agent to log in to the softphone. In step 520, using this dashboard screen, the agent is able to view their schedule and shift activities, performs self-service tasks, and clock on to the softphone.

Figure 8A:
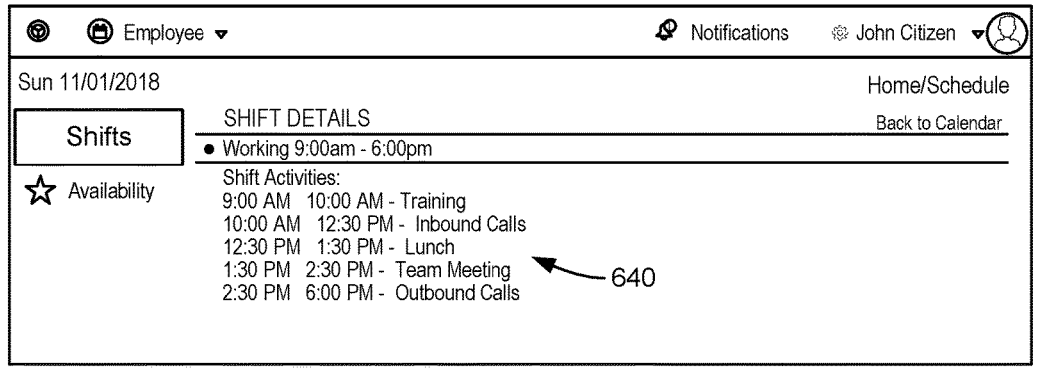
FIG. 8A is Web page displayed on the agent's browser showing their schedule for the current day.

FIG. 8A is Web page displayed on the agent's browser showing their schedule for the current day. The agent accesses this page by clicking on the day they wish to view in the dashboard screen of FIG. 7. This example shows that the agent has a variety of shift activities 640 including training, softphone use, lunch, team meeting, etc., (activities may also include other activities such as an e-mail queue, etc.). The agent's softphone shifts are scheduled from 10 a.m. until 12:30 p.m. and from 2:30 p.m. until 6 p.m. The agent may also select any day within the previous calendar view in order to view their schedule on that day. WFM application stores each daily schedule for each agent in its database 250.

Figure 8B:
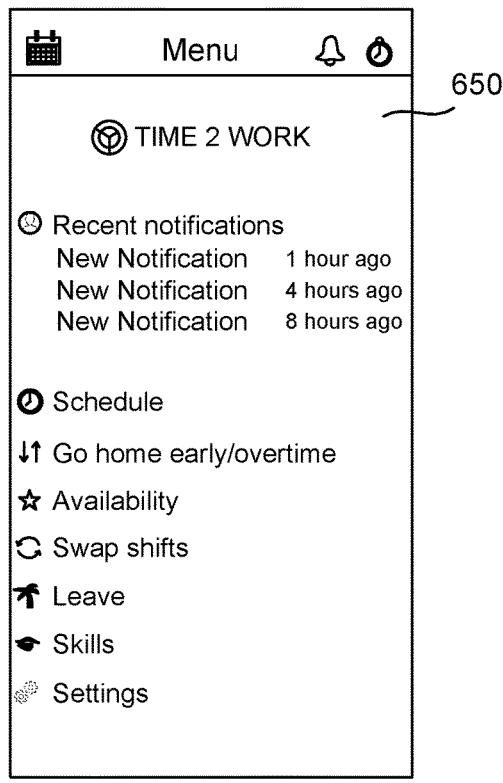
FIG. 8B Web page displayed on the agent's browser showing a variety of self-service tasks that the agent may perform.

FIG. 8B is a portion of a Web page displayed on the agent's smart phone (or other computing device) showing a variety of self-service tasks 650 that the agent may perform. The agent accesses this page by clicking on the three line icon on the home screen of the mobile Web application. This example shows that the agent may perform tasks such as view notifications, view schedule, leave early/overtime, indicate availability, swap shifts, leave, skills, settings, help, etc.

At this point, the agent has logged in to the WFM application but is not yet clocked on to perform a particular activity during a shift, such as softphone use. Typically, the WFM application will prevent the agent from clocking on to begin a shift unless it is time for that shift to begin. An agent may be logged in to the WFM application but not yet "clocked on" to an activity. Typically, "clock on" signifies when the agent begins to be paid.

As shown in FIG. 8A, each agent has particular shift activities on a given day, and the WFM application keeps track of these activities by recording a real-time status for each agent in its database. For example, an agent's status at a given time may be: "training," "Inbound calls," "Outbound calls," "e-mail queue," "lunch," "break," "meeting," "logged in," or any other duty that is configured. Thus, the agent status at 9:30 a.m. would be "training." Even though FIG. 8A shows shift activities that appear fixed, it is possible for the shift activities and times to change in real time. For example, an agent may undertake different duties than on the schedule, but he or she will be reported to the WFM as being out of adherence. Agents are not allowed to change their own schedule using some of the self-service tasks shown in FIG. 8B. However, the WFM application may change the agent's shift activities and times unilaterally. By way of example, if an agent is logged in and is available for softphone use currently, the WFM application may then schedule the agent for softphone activity at that time even though the agent was not earlier scheduled for that activity. In addition, the WFM application may schedule the agent for softphone activity (and change the agent status accordingly) if call volume within a call center (or within the organization overall) increases or decreases. For example, should an agent be handling e-mail messages at 3:30 p.m. (and have a status of "e-mail queue") and suddenly incoming call volume increases dramatically, the WFM application may immediately schedule the agent to begin a softphone activity and change the agent status to "softphone," "Outbound Calls" or "Inbound Calls."

Typically, the agent status is not changed by the WFM simply because it is time for the agent to begin a new activity (whether not the agent is logged in or clocked on). The agent must be logged in to the WFM dashboard and change their status themselves. This action will be reported back to the WFM as an adherence issue.

Accordingly, step 524 indicates that at any moment in time (whether or not the agent is logged on or off of the WFM application, and whether not the agent is performing a particular shift activity) the WFM application may change the agent status and schedule the agent for a different shift activity, even on a different day. This change in status would occur in real time and the agent would be able to view his or her change in schedule in step 520 by viewing the Web page of FIG. 8A.

Flow Diagram—Log in to Softphone

In step 528 the agent believes that a softphone shift is about to commence and he or she attempts to open the softphone application. Via the WFM application and the Web pages it displays to the agent, the agent may open the softphone application in a variety of manners. In one specific embodiment, the agent simply clicks on button 632 of the dashboard screen when it is time for their softphone shift to begin. When the agent logs into the WFM dashboard and "clocks in" the WFM will log the user in to the softphone. If he or she is scheduled for an Inbound Call or Outbound Call activity the softphone will be set to the activity that they are scheduled to undertake. If the agent is not scheduled for a softphone activity the agent will not be able to log in to the softphone in this manner, nor set that status of Inbound Call or Outbound Call.

Or, it is possible that while the user is logged into the WFM application, and is viewing the dashboard screen, that the WFM application will automatically launch the softphone and will log the agent in (as described in steps 540 and 544 below), as long as the criteria in step 532 are satisfied, without the agent having to take any specific action. This is possible because the WFM has a timing mechanism that constantly checks for events that are due to occur and takes action accordingly.

In step 532 the WFM application determines whether or not the agent is currently scheduled for a softphone activity. The WFM application will use the agent user identifier to perform a lookup in its database 250 in order to retrieve the current schedule for that agent. If the current time falls within the a time range when the agent has a scheduled shift for softphone activity then control moves to step 540 in order to launch the softphone and log the agent in to the softphone. The WFM application may also allow a time window before a softphone shift begins within which the agent may also clock on to the softphone. By way of example, the agent may be allowed to clock on to the softphone 15 minutes before a softphone activity begins, 20 minutes before, one half hour before, etc. If the agent is within that time window then control also moves to step 540. The information of FIG. 8A will be represented in database 250.

Figure 9:
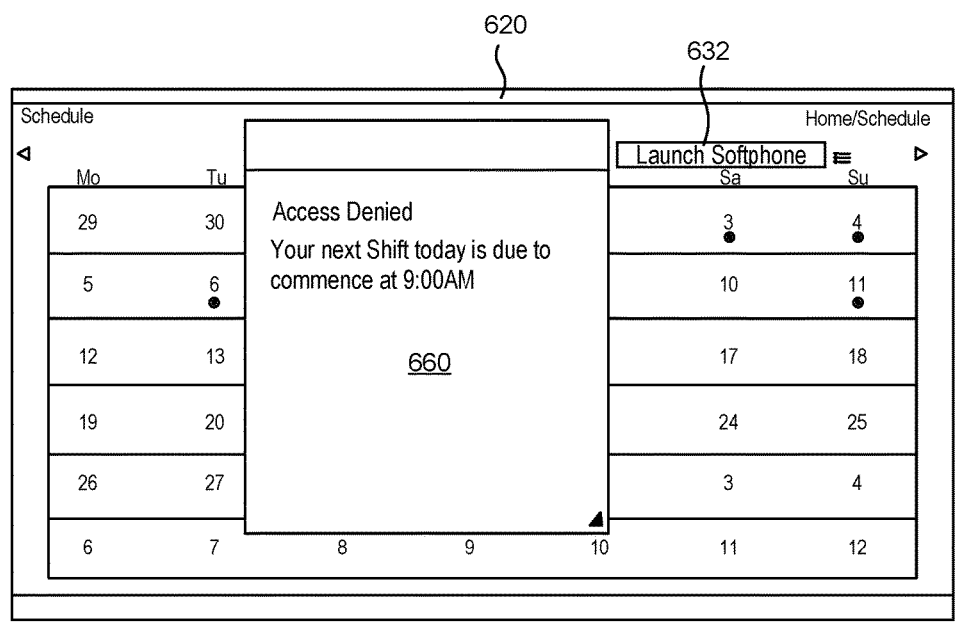
FIG. 9 is Web page and window displayed on the agent's browser showing that access to the softphone has been denied.

On the other hand, if the WFM application determines in step 532 that the agent should not clock on to the softphone, then in step 536 the WFM application denies access to the softphone by the agent. FIG. 9 is Web page 620 and window 660 displayed on the agent's browser showing that access to the softphone has been denied. The agent had clicked upon button 632 in order to clock on to the softphone, but, because their softphone shift does not begin until 9 a.m., and the current time is before 9 a.m. (and not within any time window allowed by the WFM application), the WFM application denies access and presents window 660. The WFM application may deny access to the softphone in different manners. As explained above, the agent is unaware of the credentials necessary to log into the softphone and the WFM application will not take steps to log the agent into the softphone nor will provide the agent with those login credentials. Accordingly, the agent is not clocked into the softphone and control returns to step 520 where the agent may continue to view their schedule, etc., and may choose to clock on at a later time.

In step 540 the WFM application launches the softphone on the agent computer as well as clocking on the agent. The WFM application clocks on the agent by activating the SSO (Single Sign On). If the agent does not clock on to the softphone, the agent will not be able to answer or make calls on the softphone. This will mean that the agent is Out of Adherence if the agent is scheduled for softphone activity at that time.

In general, WFM application 220 located on server computer 130 controls softphone 240 on the agent computer using bi-directional synchronization between the softphone and the WFM application. In particular, WFM application 220 calls particular functions in API 242 exposed by the softphone vendor over link 264 in order to control the softphone. Bi-directional synchronization means that any change of status made at the softphone will be fed back to the WFM application via the softphone API. Thus, if an agent logs out of the softphone, takes a break, etc., thus changing their softphone status, this information will be relayed back to the WFM application. One example is that if the user logs out of the softphone when they should be on a softphone activity, that information will be sent to the WFM which will then be able to change the agent WFM status from "Inbound Calls" (for example) to a non-phone activity such as "break," "lunch," etc.

Before logging in the agent to softphone 240, WFM application launches softphone 240 on the agent computer and begins its execution by logging the agent in to the softphone using SSO and then setting the softphone status of the agent (such as "Available").

Once the softphone is executing, in step 544 the WFM application logs the agent in to the softphone using login credentials. Unlike the prior art in which agents had access to their own login credentials and were able to log themselves in to the softphone, agent 110 does not have access to his or her login credentials. In one specific embodiment, the WFM application and the softphone share a directory service (in this example the Active Directory available from Microsoft) and therefore the softphone uses the credentials of the WFM application. The Active Directory ensures that both of these applications are synchronized, in other words, the Active Directory is responsible for maintaining the login credentials for both systems. The Active Directory is preferably hosted in Amazon Cloud, MS Azure, or in any other cloud provider of Active Directory; both applications (WFM and softphone) subscribe to Active Directory in order to allow for sign on.

Next, the WFM application calls a particular function of API 242, passing the login credentials as arguments, in order to log in the agent to the softphone, all part of the SSO process. In one particular embodiment, the agent user identifier and password used to log on to the WFM application are the same credentials used by the WFM application to log the user in to the softphone. In an alternative embodiment, using the agent user identifier for the WFM application, the WFM application looks up softphone credentials for the particular agent in its database that will be used to log in the agent to the softphone.

In addition to logging in the agent to the softphone in step 544, the WFM application will change the WFM status of the agent to "softphone," and, the WFM application will also change the status of the agent within the softphone to "taking calls," or, "available," etc., depending upon the softphone. Similar to the WFM application keeping track of the status of the agent in the context of the WFM application as described above, a softphone typically will assign a status to each agent in the context of the softphone. By way of example, an agent status in the context of the softphone may be: "Inbound Calls" (indicating that the agent is able to receive calls), "Outbound Calls" (may make calls); "unavailable" (meaning that the agent is not able to receive calls and may not make calls); "lunch" (the agent is at lunch and cannot take or make calls); "break" (the agent is on break and cannot take or make calls; and "E-mail queue" (cannot take calls). The softphone keeps track of the status of each agent in order to route calls appropriately. For example, an agent whose status is "Inbound Calls" can expect the softphone on their computer to ring any moment with an incoming call, while an agent who status is "unavailable" will not have any telephone calls routed to them.

The WFM application changes the status of the agent within the softphone to "Inbound Calls" by calling the API function "connect-rtc.js" and by changing the status. Similarly, the WFM application may change the status within the softphone to any other status by also calling the API function and changing the status.

It is possible for the agent to change their own status within the softphone, but only for status that is not Inbound Calls or Outbound Calls. In other words, an agent may not change his or her status to be "Inbound Calls" or "Outbound Calls," but may change a status from one of these to be "unavailable." Thus, an agent cannot change a status to allow use of the softphone when the WFM has not authorized that use.

As mentioned above, the softphone also keeps track of its own status of the agent. Once the WFM application has logged the agent in to the softphone in step 544 the softphone is able to track the status of this agent, and this activity is reflected in step 548. As mentioned above, the WFM application may command the softphone to change the status of the agent (e.g., from "unavailable" to "taking calls"); it is also possible for the softphone itself to generate agent state change events or for the agent himself or herself to manually change his or her status to any non-call status. The softphone itself change the agent status by invoking the API.

In the event that the softphone changes the status of the agent or the agent changes their own status in the context of the softphone, in step 552 this information may be communicated over link 264 back to the WFM application. In one particular embodiment, the WFM application will monitor agent state change events made on the softphone by using an API function of the softphone. The WFM application may be configured to poll for an event change or may be configured to wait for a notification of an agent state change event, using the API "connect-rtc.js." Typically, the softphone will not generate status events before an agent is logged in because the softphone has no visibility of the agent unless the agent is logged in.

Flow Diagram—Softphone Use and Shift Activities

In step 560 the agent uses the softphone to take calls or to make calls in accordance with the functioning of the particular telephony software being used.

Figure 10:
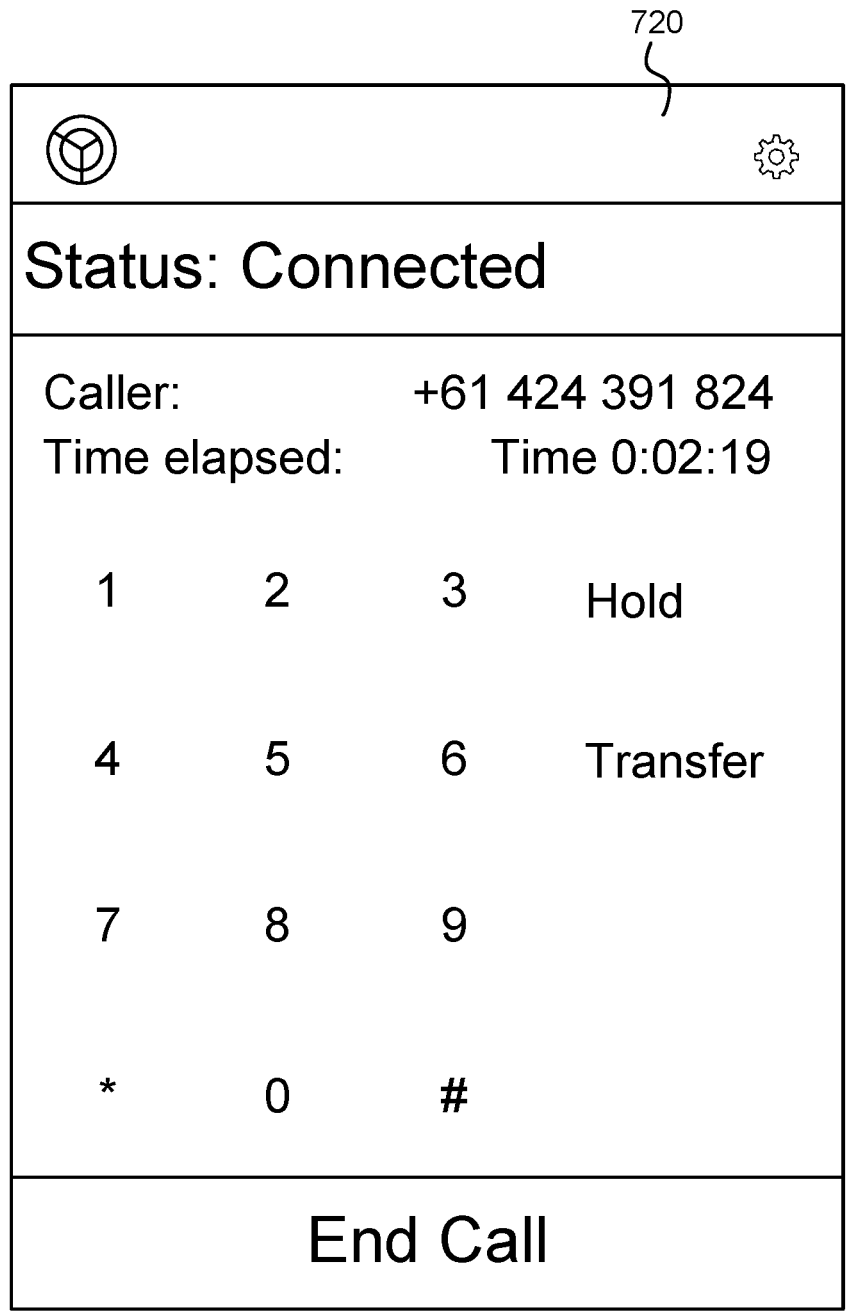
FIG. 10 is a screenshot of the agent computer showing an interface to the softphone.

FIG. 10 is a screenshot of the agent computer showing an interface window 720 generated by the WFM application when the agent is logged in to the softphone and is using the softphone to make calls to receive calls. In this embodiment, the softphone is accessed via a Web page; it is not resident on the agent computer. Shown is the call status of being "Connected" to a caller, the telephone number of that caller, elapsed time on the call, a keypad for dialing, and a button to end the call. A settings button (the "gear") allows the agent to change settings within the softphone, log off of the softphone, etc. The agent does not have the ability to change any of their login credentials (user name, password, etc.) because those credentials are not available to the agent.

During the course of the agent's shift using the softphone it is possible that in step 524 the WFM application makes a determination that the agent should temporarily perform another activity (e.g., handling an e-mail queue, training, etc.) and a decision is made in step 564 by the WFM application that the agent status should be changed to that other activity (e.g., "e-mail queue"). It is also possible that a softphone shift early in the day has ended normally, that other non-phone activity is about to occur, and that there will be another softphone shift later in the day, in which case it is not necessary for the WFM application to log the agent off of the softphone. (See the example of FIG. 8A.) Typically, the agent remains logged in to the softphone while other activities are occurring, during his or her entire shift, but the softphone status is changed to reflect the activity. It is not strictly required that the agent be logged off the softphone every time a softphone activity ends or the agent is temporarily assigned to a different activity.

It is also possible that the agent may unilaterally decide that softphone activity should temporarily be halted (e.g., taking a break) and may change their softphone status to "unavailable." In step 568, if the WFM application determines that there should be a change from a softphone activity to a non-phone activity then the WFM application will block access to the softphone by calling the API function above in order to change the softphone status of the agent to "unavailable." The agent will not necessarily be logged out of the softphone at this time because this may be a temporary change of status.

Figure 11:
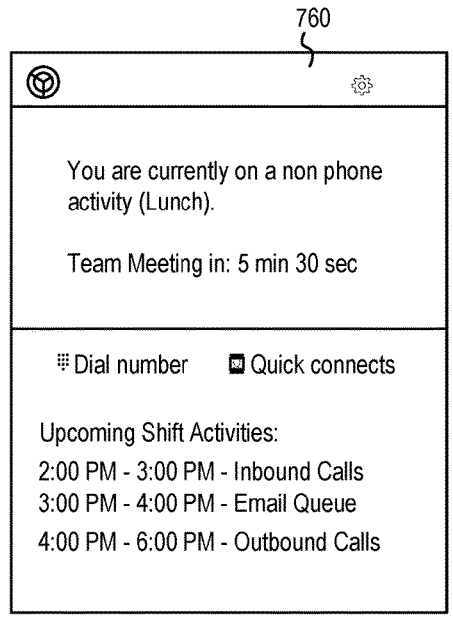
FIG. 11 shows a window generated on the agent computer by the WFM Application.

FIG. 11 shows a window 760 generated on the agent computer by the WFM application. In this example schedule, the window indicates that the agent's softphone status has been changed to "unavailable" because of a non-phone activity (e.g., "lunch"); the agent will not be able to use the softphone during this non-phone activity because the WFM application has changed the softphone status of the agent. Note that in this example, the agent has another non-phone activity (e.g., a team meeting) after lunch, meaning that the agent's status in the softphone will continue to be "unavailable." Assuming that the agent continues to be logged in to the softphone and clocks on for these upcoming activities, note that at 2 p.m. the WFM application will change the WFM status of the agent to "softphone" (and will command the softphone to change the agent's softphone status to "Inbound Calls"), and that at 3 p.m. the WFM application will change the WFM status of the agent to "e-mail queue" (the softphone status being changed back to "unavailable"). At 4 p.m. the WFM application will change the WFM status of the agent back to "softphone" (at which time the WFM application will also command the softphone to change the agent's softphone status to "Outbound Calls"). The WFM application uses the API "connect-rtc.js." to make these changes.

As mentioned earlier, if an agent is on lunch, on break or in a meeting (any non-phone activity, the agent is not able to change their own softphone status back to "Inbound calls," "Outbound Calls," or other use of the softphone. But, if an agent is currently taking calls on the softphone, they can change their own softphone status to "break" if they need to take a break.

Once the agent's non-phone activities have ended, and assuming that the agent should return to a softphone activity and does select the softphone, the WFM application changes the WFM status of the agent back to "softphone," commands the softphone to change the agent's softphone status back to "taking calls," control returns to step 560, and the agent continues taking and making calls.

In step 572 the WFM application makes a determination that the agent's softphone activity has ended for the day (e.g., the agent has a schedule as shown in FIG. 11 and it is now 6 p.m.) and decides that the agent shall be logged off of the softphone. Such a decision may occur normally when the last softphone shift of the day ends for that agent, or, in step 524 the WFM application may make a decision that the agent's softphone shift shall end and that the agent shall be logged off of the softphone. In step 576 the WFM application logs the agent off of the smart phone by calling an API function and instructing the softphone not only to change the agent status to "unavailable," but also to log the agent off. The WFM will also change the agent WFM status from "Inbound Calls" to "logged in." The WFM will launch the softphone as required.

Figure 12:
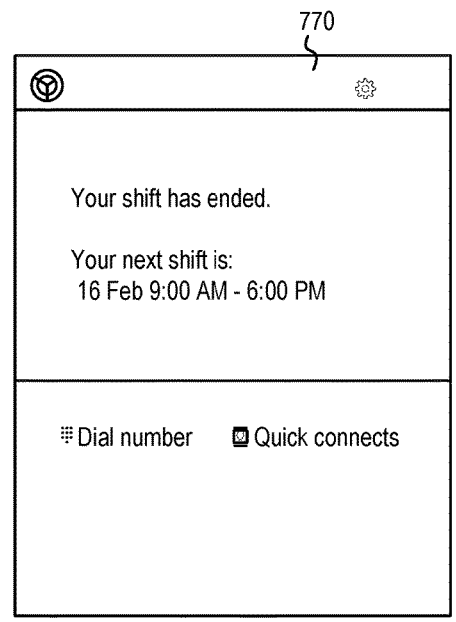
FIG. 12 shows a window generated on the agent computer by the WFM Application.

FIG. 12 shows a window 770 generated on the agent computer by the WFM application. In this example, the window indicates that the agent's shift for the day has ended and provides the date of the next shift. At this point, the agent is unable to use the softphone because they have been logged off and do not have access to the softphone login credentials.

Figure 13:
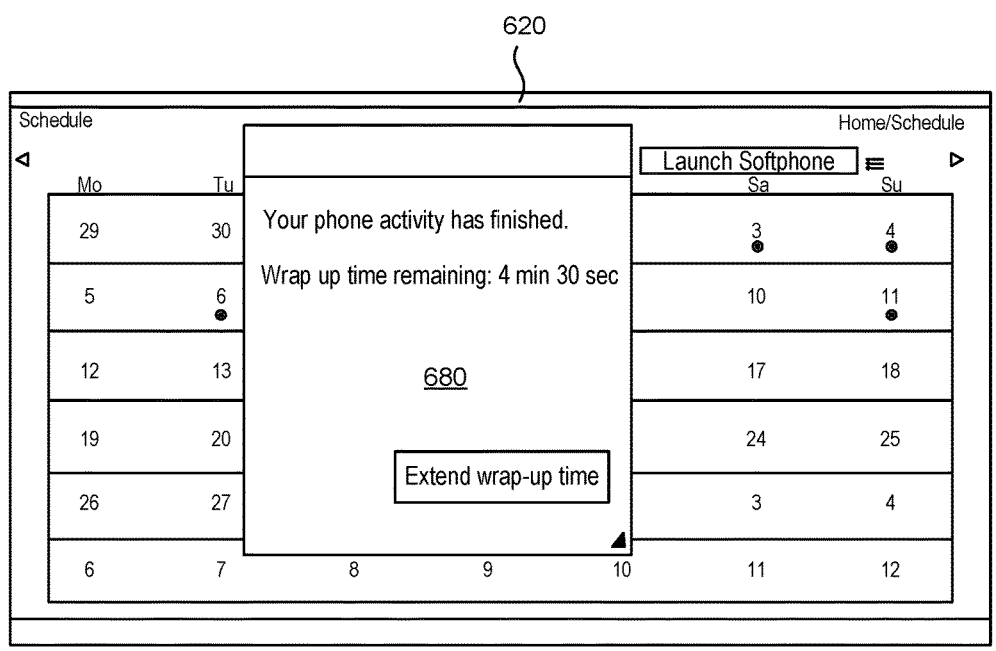
FIG. 13 shows a window displayed on the agent computer by the WFM application.

FIG. 13 shows a window 680 displayed on the agent computer by the WFM application. Window 680 indicates that the agent's softphone shift has ended and that wrap-up time is remaining; also displayed is the Web page 620 showing the agent's schedule as described earlier. At this point in time the agent may have another non-phone activity to perform, may perform any self-service functions, or he or she may be done for the day. Once the wrap-up time is over and no other activities remain the WFM application may clock the agent off. In step 580, assuming that the agent has finished their shift for the day, the agent logs out of the WFM application and may close window 620 and their browser application, if desired.

Implementation of Various Embodiments

As shown above, FIGS. 2, 3 and 4 illustrate different embodiments in which the telephony software may be resident on different computers, the embodiment of FIG. 2 being explained in the above flow diagram. Further details on the embodiments of FIG. 3 and FIG. 4 are provided below.

In FIG. 3, telephony software module 340 is resident on a cloud computing platform and is accessed by an agent using browser 210 over link 368. The telephony software presents Web pages on the agent browser and the agent interacts with the telephony software via these Web pages. Preferably, the WFM application connects over link 364 to the API of the softphone and uses the same API as above to connect to the softphone.

In FIG. 4, telephony software application 440 is resident on a cloud computing platform and is accessed by an agent using a browser. The agent views Web pages of the telephony software application 440 on his or her browser in order to use the softphone. The WFM application connects over link 464 to the API of the softphone using the connect-rtc.js API.

Figure 14:
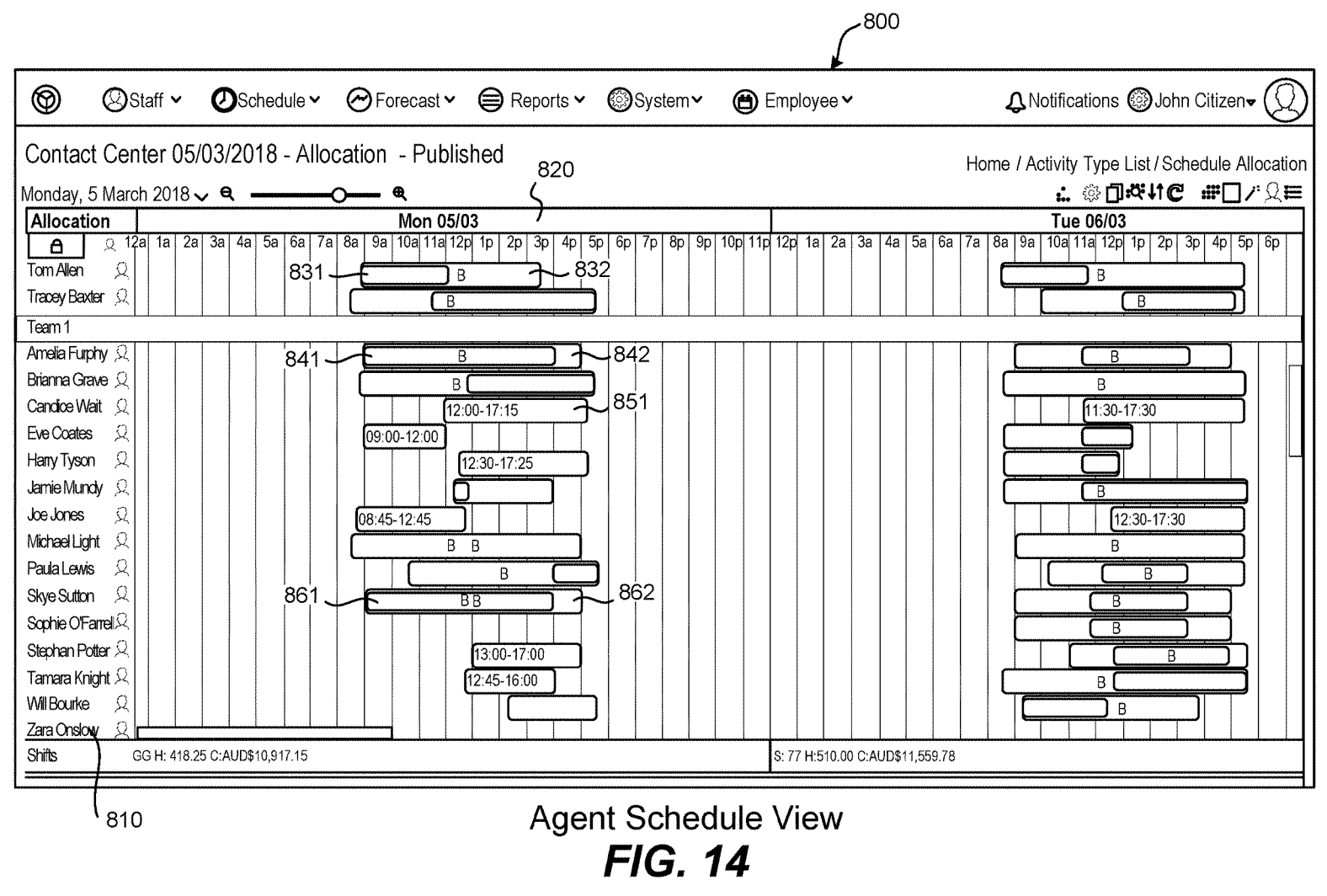

FIG. 14 shows an embodiment in which multiple agents are each using telephony software from different agent computers. Shown is a Web page 800 viewed on, for example, an administrator computer, showing any number of agents 810 and their schedule for a particular day 820. A first agent has an activity 831, a break "B" and softphone use (inbound calls) 832. A second agent has an activity 841 (a non-phone activity), a break "B" and softphone use (outbound calls) 842. A third agent has softphone use (inbound calls) 851. A fourth agent has a non-phone activity 86, a break "B" and softphone use (outbound calls) 862. Of course, this information on agents and schedules is also stored within a database 250 of the WFM application.

Computer System Embodiment

Figure 15A:
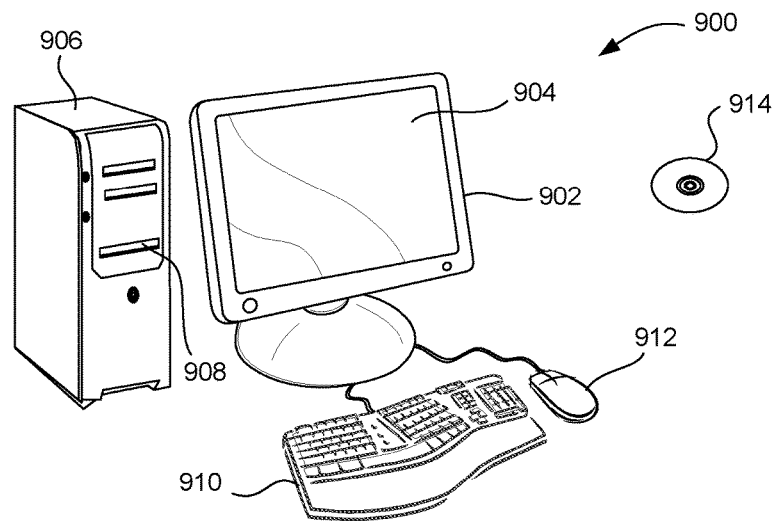
FIGS. 15A and 15B illustrate a computer system suitable for implementing embodiments of the present invention.
Figure 15B:
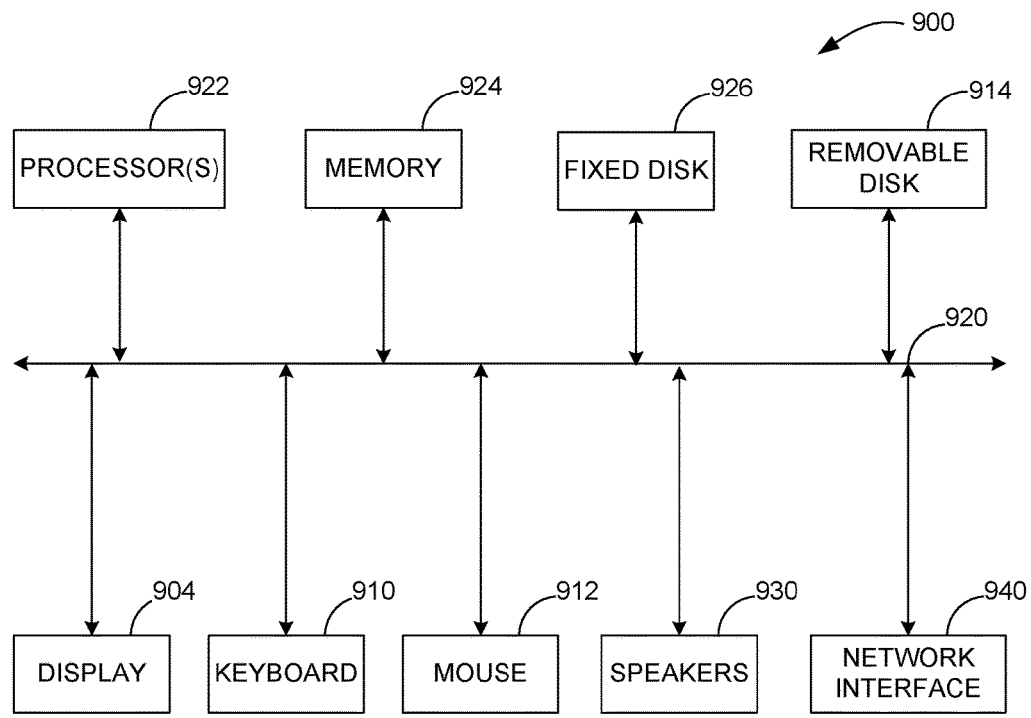

FIGS. 15A and 15B illustrate a computer system 900 suitable for implementing embodiments of the present invention. FIG. 15A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 15B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of controlling telephony software from a Web application, said method comprising:
   receiving Web login credentials from a user of a remote computer and logging in said user to a Web application on a server computer;
   receiving a request from said remote computer to log said user in to telephony software executing on said remote computer, said user not having access to login credentials of said telephony software;
   determining, by said Web application, whether or not said user is permitted to log in to said telephony software by comparing a current time and date to a time and date stored in a database of said Web application of scheduled telephony activity of said user; and
   only when it is determined that said user is permitted to log in to said telephony software, said Web application calling an API function of said telephony software and sending said telephony login credentials from said Web application to said telephony software in order to log said user in to said telephony software, whereby said user is permitted to use said telephony software on said remote computer.

2. A method as recited in claim 1 wherein said request further includes a request from said remote computer to launch said telephony software.

3. A method as recited in claim 1 wherein said determining permits said user to log in to said telephony software if said current time and date is within a predetermined window of time earlier than said stored time and date.

4. A method as recited in claim 1 wherein said Web application is a workforce management application.

5. A method as recited in claim 1 further comprising:
   sending a command from said Web application to said telephony software that changes the status of said user within said telephony software indicating that said user is available to receive or make telephone calls over said telephony software.

6. A method as recited in claim 1 further comprising:
   sending a command from said Web application to said telephony software that changes the status of said user within said telephony software indicating that said user is unavailable to receive or make telephone calls over said telephony software.

7. A method of controlling telephony software from a Web application, said method comprising:

receiving Web login credentials from a user of a remote computer and logging in said user to a Web application on a first server computer;

receiving a request from said remote computer to log said user in to telephony software executing on a second server computer different from said remote computer, said user not having access to login credentials of said telephony software;

determining, by said Web application, whether or not said user is permitted to log in to said telephony software by comparing a current time and date to a time and date stored in a database of said Web application of scheduled telephony activity of said user;

only when it is determined that said user is permitted to log in to said telephony software, said Web application calling an API function of said telephony software and sending said telephony login credentials from said Web application to said telephony software on said second server computer in order to log said user in to said telephony software, whereby said user is able to use said telephony software via a Web page on said remote computer.

8. A method as recited in claim 7 wherein said request further includes a request from said remote computer to launch said telephony software.

9. A method as recited in claim 7 wherein said determining permits said user to log in to said telephony software if said current time and date is within a predetermined window of time earlier than said stored time and date.

10. A method as recited in claim 7 wherein said Web application is a workforce management application.

11. A method as recited in claim 7 further comprising:
sending a command from said Web application to said telephony software that changes the status of said user within said telephony software indicating that said user is available to receive or make telephone calls over said telephony software.

12. A method as recited in claim 7 further comprising:
sending a command from said Web application to said telephony software that changes the status of said user within said telephony software indicating that said user is unavailable to receive or make telephone calls over said telephony software.

13. A method of controlling telephony software from a Web application, said method comprising:
receiving Web login credentials from a user of a remote computer and logging in said user to a Web application on a first server computer;

receiving a request from said remote computer to log said user in to telephony software executing on a second server computer different from said remote computer, said user not having access to login credentials of said telephony software;

determining, by said Web application, whether or not said user is permitted to log in to said telephony software by comparing a current time and date to a time and date stored in a database of said Web application of scheduled telephony activity of said user;

only when it is determined that said user is permitted to log in to said telephony software, said Web application calling an API function of said telephony software and sending said telephony login credentials from said Web application to said telephony software on said second server computer in order to log said user in to said telephony software, whereby said user is able to use telephony client software executing on said remote computer.

14. A method as recited in claim 13 wherein said request further includes a request from said remote computer to launch said telephony software.

15. A method as recited in claim 13 wherein said determining permits said user to log in to said telephony software if said current time and date is within a predetermined window of time earlier than said stored time and date.

16. A method as recited in claim 13 wherein said Web application is a workforce management application.

17. A method as recited in claim 13 further comprising:
sending a command from said Web application to said telephony software that changes the status of said user within said telephony software indicating that said user is available to receive or make telephone calls over said telephony software.

18. A method as recited in claim 13 further comprising:
sending a command from said Web application to said telephony software that changes the status of said user within said telephony software indicating that said user is unavailable to receive or make telephone calls over said telephony software.

19. A method as recited in claim 13 further comprising:
said user using said remote computer in order to utilize said telephony client software in order to receive or make telephone calls.

20. A method as recited in claim 7 wherein said first and second server computers are the same computer.

21. A method as recited in claim 13 wherein said first and second server computers are the same computer.

* * * * *